US010341879B2

(12) United States Patent
Kahtava et al.

(10) Patent No.: US 10,341,879 B2
(45) Date of Patent: Jul. 2, 2019

(54) MOBILE COMMUNICATION SYSTEM, METHODS AND BASE STATION

(71) Applicant: SONY CORPORATION, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/546,518

(22) PCT Filed: Feb. 22, 2016

(86) PCT No.: PCT/EP2016/053639
§ 371 (c)(1),
(2) Date: Jul. 26, 2017

(87) PCT Pub. No.: WO2016/135082
PCT Pub. Date: Sep. 1, 2016

(65) Prior Publication Data
US 2018/0054742 A1 Feb. 22, 2018

(30) Foreign Application Priority Data

Feb. 23, 2015 (EP) .................... 15156163

(51) Int. Cl.
*H04W 16/18* (2009.01)
*H04W 40/10* (2009.01)
(Continued)

(52) U.S. Cl.
CPC .......... *H04W 16/18* (2013.01); *H04B 7/2606* (2013.01); *H04W 24/10* (2013.01); *H04W 88/08* (2013.01)

(58) Field of Classification Search
CPC ..... H04W 16/18; H04W 24/10; H04W 88/08; H04B 7/2606
See application file for complete search history.

(56) References Cited

U.S. PATENT DOCUMENTS 8,737,297 B2   5/2014   Reznik et al.
8,842,599 B2   9/2014   Osseiran et al.
(Continued)

FOREIGN PATENT DOCUMENTS

KR   10-2014-0139809 A   12/2014
WO       2016/116289 A1    7/2016

OTHER PUBLICATIONS

"3rd Generation Partnership Project; Technical Specification Group Radio Access Network; Small cell enhancements for E-UTRA and E-UTRAN—Physical layer aspects", Release 12, 3GPP TR 36,872 V12.1,0. Dec. 2013, 100 pages.
(Continued)

*Primary Examiner* — Kiet Tang
(74) *Attorney, Agent, or Firm* — Xsensus LLP

(57) ABSTRACT

A mobile communications system comprising a base station as a network controller configured to receive measurement information from one or more infrastructure units, analyze the measurement information to identify all potential communications paths between the infrastructure units and create and transmit a look-up table from the analysis that links each of the incoming communications paths with relevant communications sessions of the infrastructure units into outgoing communications paths with relevant combined sessions for each of the relay nodes.

20 Claims, 9 Drawing Sheets

(51) Int. Cl.
*H04W 24/00* (2009.01)
*H04B 7/26* (2006.01)
*H04W 24/10* (2009.01)
*H04W 88/08* (2009.01)

(56) References Cited

U.S. PATENT DOCUMENTS

| | | |
|---|---|---|
| 2004/0125778 A1 | 7/2004 | Haligli et al. |
| 2008/0123584 A1 | 5/2008 | Behrendt et al. |
| 2011/0026429 A1 | 2/2011 | Slimane et al. |
| 2013/0107768 A1* | 5/2013 | Murakami ............ H04W 40/10 370/310 |
| 2015/0055502 A1* | 2/2015 | Seo ....................... H04W 24/00 370/252 |

OTHER PUBLICATIONS

Holma, H., et al., "LTE for UMTS OFDMA and SC-FDMA Based Radio Access", System Architecture Based on 3GPP SAE, Jan. 2010, pp. 25-27.

Pahlevani, P., et al., "Novel Concepts for Device-to-Device Communication using Network Coding", IEEE Communications Magazine, Apr. 2014, 3 pages (abstract only).

Medard, M., et al., "Network Coding; Fundamentals and Applications", Academic Press, 2012, 6 pages (abstract only).

International Search Report dated Apr. 18, 2016 in PCT/EP2016/053839 filed Feb. 22, 2016.

Communication Pursuant to Article 94(3) issued Jan. 21, 2019 in European Application No. 16706574.7-1220.

\* cited by examiner

MOBILE COMMUNICATION SYSTEM, METHODS AND BASE STATION

CROSS-REFERENCE TO RELATED APPLICATIONS

This application is the National Stage of International Application No. PCT/EP2016/053639, filed Feb. 22, 2016, which claims priority to European Patent Application 15156163.6, filed in the European Patent Office on Feb. 23, 2015, the entire contents of which is being incorporated herein by reference.

TECHNICAL FIELD OF THE DISCLOSURE

The present disclosure relates to a mobile communications system, method, and base station which can be arranged to form a look-up table from measurement information from one or more infrastructure units, comprising one or more relay nodes and one or more mobile communication terminals. The look-up table can be used to identify links between each of the incoming communications paths with relevant communications sessions of the infrastructure units into outgoing communications paths with relevant combined sessions for each of the relay nodes.

Embodiments of the present technique can provide methods of communicating data in a small cell environment where relay nodes may be used.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communications device such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

With the continuous growth in data transmitted in mobile networks, continually increasing network capacity comparatively is a problem faced by the industry. There are three parameters which can be changed in order to increase Radio Access network capacity: higher spectral efficiency, more radio spectrum and denser cell layout. The two former of these have limitations on the expected gains over today's LTE, and certainly improvements on the order of magnitude or more are not possible. Thus, in order to meet the stated 1000× capacity targets, small cells are getting a lot of attention [1].

An objective technical problem addressed by the present disclosure, then, is to increase network capacity through the employment of small cells and relay nodes. This in itself has its own set of challenges to overcome.

SUMMARY OF THE DISCLOSURE

According to an example embodiment of the present technique there is provided a mobile communications system comprising a base station as a network controller. The base station is configured to transmit a request message for measurement information to one or more infrastructure units, which comprise one or more relay nodes and one or more mobile communication terminals, to receive, in response to the request message, the measurement information from the one or more infrastructure units, to analyse the measurement information to identify all potential communications paths between the one or more infrastructure units, to create a look-up table from the analysis of the measurement information that links each of the incoming communications paths with relevant communications sessions of the infrastructure units into outgoing communications paths with relevant combined sessions for each of the relay nodes, and to transmit at least a part of the look-up table to each of the one or more infrastructure units, the at least a part of the look-up table being relevant to the infrastructure unit.

According to another example embodiment of the present technique there is provided a method of operating a base station as a network controller, the method comprising transmitting a request message for measurement information to one or more infrastructure units, comprising one or more relay nodes and one or more mobile communication terminals, receiving, in response to the request message, the measurement information from the one or more infrastructure units, analysing the measurement information to identify all potential communications paths between the one or more infrastructure units, creating a look-up table from the analysis of the measurement information that links each of the incoming communications paths with relevant communications sessions of the infrastructure units into outgoing communications paths with relevant combined sessions for each of the relay nodes, and transmitting at least a part of the look-up table to each of the one or more infrastructure units, the at least a part of the look-up table being relevant to the infrastructure unit.

According to a further example embodiment of the present technique there is provided a base station forming part of a mobile communications system, the base station being configured to: transmit a request message for measurement information to one or more infrastructure units, comprising one or more relay nodes and one or more mobile communication terminals, receive, in response to the request message, the measurement information from the one or more infrastructure units, analyse the measurement information to identify all potential communications paths between the one or more infrastructure units, create a look-up table from the analysis of the measurement information that links each of the incoming communications paths with relevant communications sessions of the infrastructure units into outgoing communications paths with relevant combined sessions for each of the relay nodes, and transmit at least a part of the look-up table to each of the one or more infrastructure units, the at least a part of the look-up table being relevant to the infrastructure unit.

There are various algorithms and cost functions to consider when setting up the subgraphs within an active set of edges between network nodes. In practical wireless networks, the management of the combinations of sessions from incoming edges into outgoing edges is much more complex than the line diagrams as depicted in FIGS. 5 to 7. First of all, the radio propagation environment is inherently hostile and transmissions sent by separate sources on overlapping time units interfere with one another at a receiver antenna input. There are questions on whether there is a centrally coordinated approach on the nodes transmitting or whether they are more independent and operate on a distributed coordination basis. Successful reception of transmitted signals requires synchronisation between the transmitter and receiver, and in a multi-node network it is not readily apparent what is used as the basis for the synchronisation, unless all of the nodes are only connected to the serving eNodeB and synchronise to its timing advance commands.

The conditions in the network may change in time. For example, a relay node may move or be moved elsewhere, or a new relay node may enter the area. A network coding residual network that is optimised for a given situation at a given time clearly is not optimal for a changed scenario, which may even cause one of the relay nodes to no longer be able to decode arriving packets from one or more of its incoming edges. With all of these wireless network challenges at hand, the relay nodes have to be able to determine which messages to receive and decode and when to do it.

The present disclosure can provide an arrangement for setting up a centrally coordinated network of relay nodes which include an indication of a source and destination of data packets and how the data packets may be combined with other data packets. The arrangement can therefore provide the establishing of a centrally coordinated network of relay nodes with guidelines on what data packets they receive and from where, and how those data packets are potentially combined by other data packets and what their destinations are. This provides an advantage in terms of the control signalling overhead point of view compared to the case that a transmitting relay node would add all this information into a header field. The disclosure further allows the network controller to separate relay nodes in distinct subgroups for Radio Resource Management purposes which would increase the overall device-to-device (D2D) capacity under the serving cell. The subgroup concept further allows the establishment of a group of D2D devices that overlaps a cell border whilst retaining a single, centralised source of synchronisation signals for that inter-cell subgroup.

Accordingly, the embodiments of the present technique can provide an arrangement where measurements on various links can be provided in a network including base stations, relay nodes and terminals. These measurements can then be used to select the relay nodes for forwarding packets from different communication sessions from multiple mobile communication terminals in an efficient manner, and setting up and maintaining the paths between source and sink for those sessions.

Various further aspects and features of the present technique are defined in the appended claims, which include a mobile communications system comprising a base station as a network controller, a method of operating a base station as a network controller, and a base station forming part of a mobile communications system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
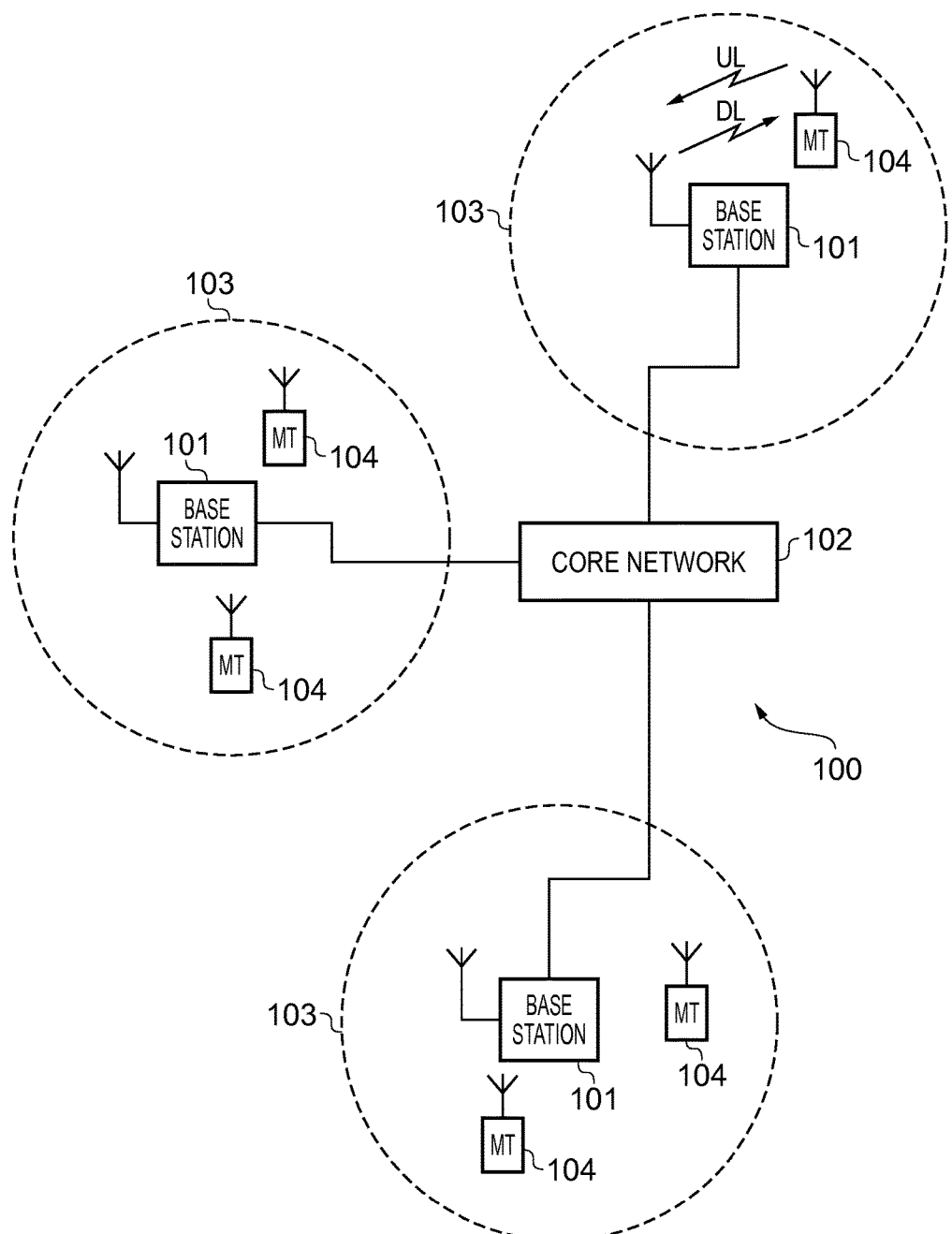
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. The terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carrier is available.

Figure 2:
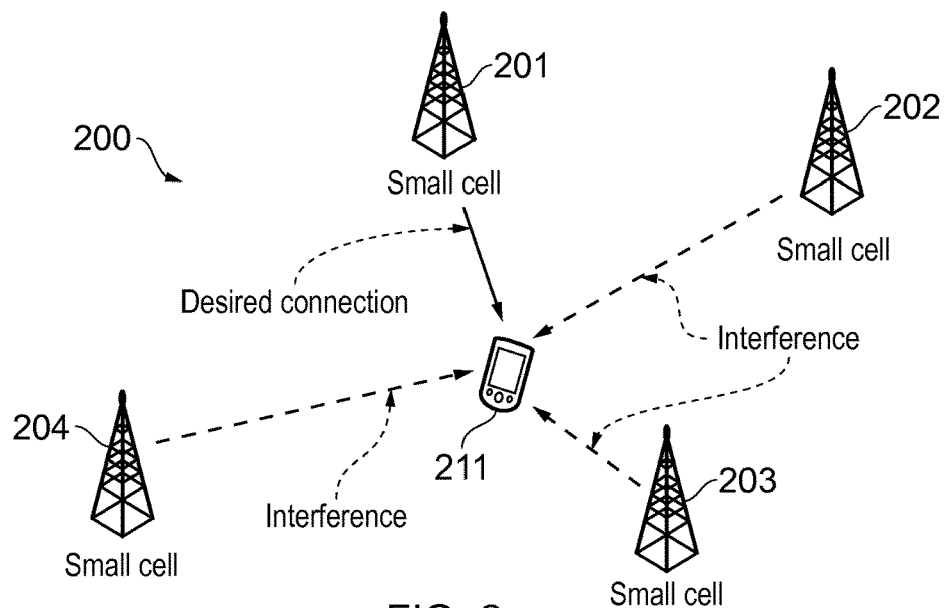
FIG. 2 schematically illustrates an example of a small cell environment.

FIG. 2 illustrates an example of a small cell environment 200 wherein a plurality of base stations 201 to 204 are operable to communicate with terminals, such as terminal 211. In this example, the terminal 211 is in communication with base station 201 providing a first small cell but is within the range of the small cell for each of base stations 202, 203 and 204. As a result, the signals sent by base station 201 to terminal 211 can suffer from interference from signals transmitted by base stations 202 to 204. While with conventional macrocell networks the same type of situation would also be likely, in practice, the mobile operator is in a position to carry out frequency planning, distributing frequencies amongst base stations in a static or dynamic manner. Accordingly, the level of interference can be significantly reduced for macrocells. On the other hand, when dealing with a small cell network, there may be a potentially very large number of base stations, each using different powers such that network planning becomes much more difficult, and the complexity also increases with the number of active small cells in an area. In particular, if a large number or small cells are available in an area, it is likely that they will not be able to each be allocated a different, non-overlapping frequency bands such that transmissions from different cells would not interfere with each other. Moreover, small cell networks have the additional difficulty that a small cell may be mobile, i.e. not stationary, while network planning for a macrocell or legacy femto/picocells was generally based on stationary or fixed base stations. This also increases the complexity of trying to reduce interference significantly. Of course, interference between small cells can be significant when the number of deployed small cells increases such that in a dense small cell environment, interference reduction can be challenging. As a result, in the event that the interference affects synchronization signals or reference signals of small cells, terminals may not even be able to discover and connect to small cells.

Figure 3:
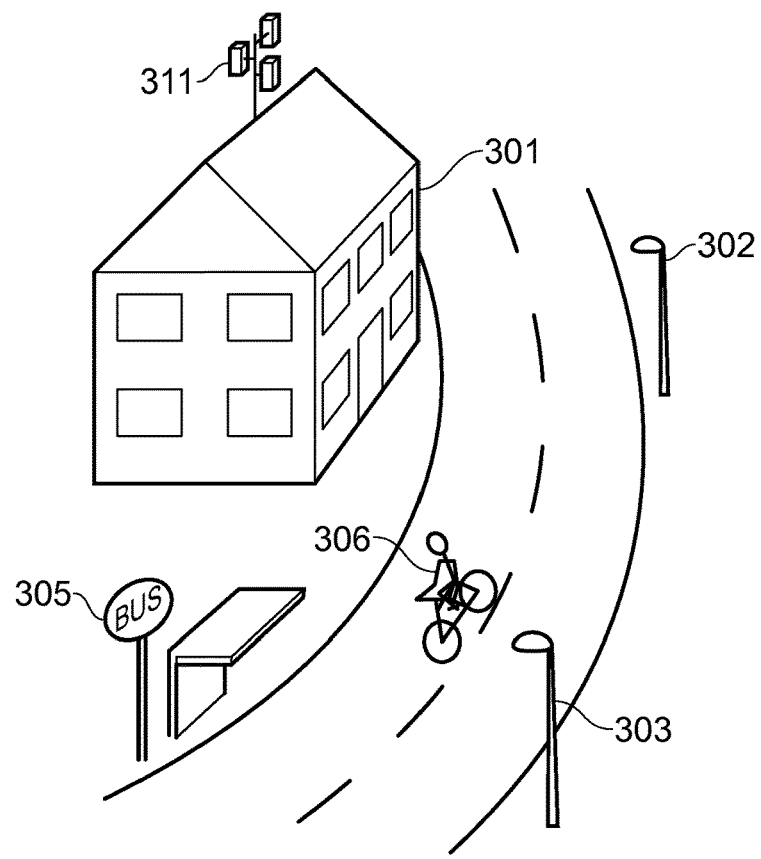
FIG. 3 illustrates another example of a small cell environment.

An example of a small cell environment 300 is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In this example, the planning for interference may vary depending on traffic and on time. For example a cyclist may enter an interference zone this zone. However, the base station 301, if serving an office, may potentially only be used during office hours and may be turned off during the rest of the day or the rest of the week. A variety of base stations may thus be providing a small or macro cell and the base station may have very different profile regarding time of use, frequency capabilities, power/range, additional functionalities, etc.

Figure 4:
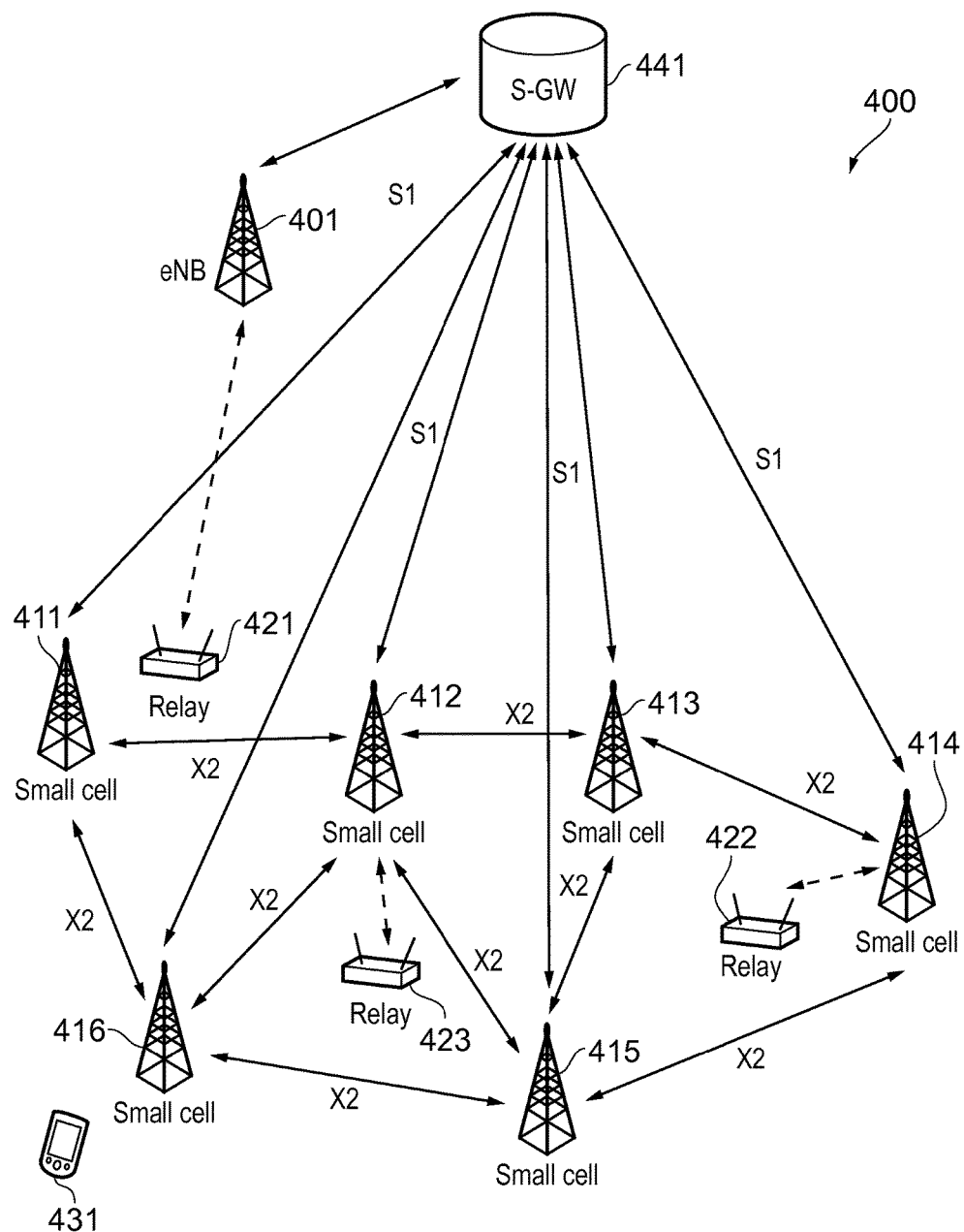
FIG. 4 illustrate an example system for communicating with at least a terminal in a heterogeneous network.

Moreover, mobile networks can also include relay nodes which can further increase the complexity of the mobile system and of the reduction of interference in a small cell network. FIG. 4 illustrates an example system 400 for communicating with at least a terminal 431. In this system 400, a base station 401 provides a macrocell and six base stations 411 to 416 provide small cell coverage, potentially overlapping with the coverage of the base station 401. Additionally, three relay nodes 421 to 423 are provided and are operating with base stations 401, 414 and 412, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 411 to 416 and the Serving Gateway "S-GW" in FIG. 4. Relay nodes may also send or receive data with the terminals or base stations which can also add to the complexity of dealing with interference in an environment as illustrated in FIG. 4.

Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

It is disclosed in co-pending European patent application EP15151967.5 (the contents of which are incorporated herein by reference), how UEs and relaying nodes in a wireless network, which may use network coding principles, measure and report on conditions of the channel. These measurements are then used by a network controller to set up actual active links between nodes—known as the residual network—whilst some potential links are left unused due to bad channel quality or other limitations.

A communications network can be considered to be a collection of directed links connecting transmitters, switches and receivers. The communications network may be represented by a directed subgraph G=(V, E) with a vertex set V and an edge set E. The vertices are the transmitters, switches and receivers, and the edges are the links or paths between them. There may be multiple edges between two vertices. Edges are denoted by round brackets $(v_1, v_2) \in E$, and are assumed to be directed. The head and tail of an edge e=(v', v) is denoted by v=head(e) and v'=tail(e). We define $\Gamma_I(v)$ as the set of edges that end at a vertex $v \in V$, and $\Gamma_O(v)$ as the set of edges which originate from the vertex v. These may be expressed as:

$$\Gamma_I(v) = \{e \in E : \text{head}(e) = v\}$$

$$\Gamma_O(v) = \{e \in E : \text{tail}(e) = v\}$$

The in-degree of $\delta_I(v)$ or v is defined as $\delta_I(v) = |\Gamma_I(v)|$, while the out-degree $\delta_O(v)$ is defined as $\delta_O(v) = |\Gamma_O(v)|$. In other words, they describe the number of edges entering and leaving a vertex.

Figure 5:
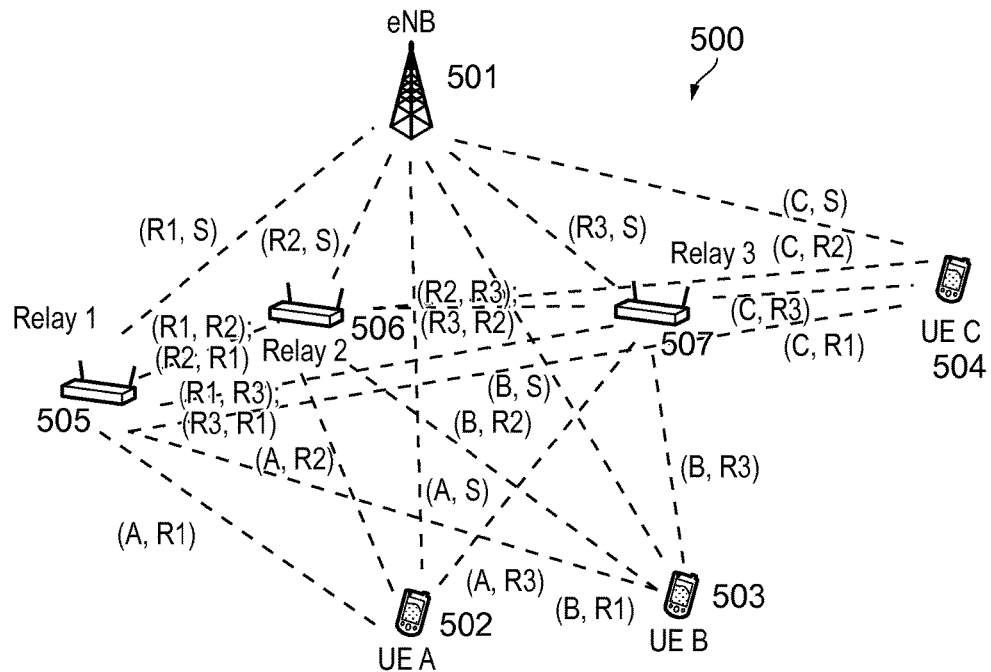
FIG. 5 illustrates an example of a measurement set of edges in a relay assisted communications network.

FIG. 5 shows a mobile communications system 500 in which three UEs 502 to 504 and three relay nodes 505 to 507 are camping under an eNodeB 501. Through means such as the use of downlink system information on relay nodes available under the eNodeB 501 coverage area, all the three relay nodes are identified and provided as potential relays for the UEs. This set of all possible links between UEs and relay nodes on the one hand, and between relay nodes on the other hand, is the measurement set, which is the starting point for establishing the residual network for network coded communications.

TABLE I

Edges in FIG. 5 evaluated based on reported measurements from UEs and relay nodes

| Node | $\Gamma_I$ (incoming edges) | | $\Gamma_I$ (outgoing edges) |
|---|---|---|---|
| R1 | (A, R1) | >$Q_{UE}$ | (R1, S) |
|  | (B, R1) | <$Q_{UE}$ | (R1, R2) |
|  | (C, R1) | <$Q_{UE}$ | (R1, R3) |
|  | (R2, R1) | >$Q_{node}$ |  |
|  | (R3, R2) | <$Q_{node}$ |  |
| R2 | (A, R2) | >$Q_{UE}$ | (R2, S) |
|  | (B, R2) | >$Q_{UE}$ | (R2, R1) |
|  | (C, R2) | <$Q_{UE}$ | (R2, R3) |
|  | (R1, R2) | >$Q_{node}$ |  |
|  | (R3, R2) | >$Q_{node}$ |  |
| R3 | (A, R2) | <$Q_{UE}$ | (R3, S) |
|  | (B, R3) | >$Q_{UE}$ | (R3, R1) |
|  | (C, R3) | >$Q_{UE}$ | (R3, R2) |
|  | (R1, R3) | <$Q_{node}$ |  |
|  | (R2, R3) | >$Q_{node}$ |  |

After all the edges in the measurement sets are reported on by the relay nodes and UEs, the network side controller can build a list of edges that fulfil preset criteria on making an edge part of the active set. One example of such a list is set out in Table I above. In this case, for example, the direct link between relay nodes R1 and R3—(R1, R3) and (R3, R1)—is deemed to be of poor quality (less than a threshold for quality between relay nodes $Q_{node}$) and is not added to to the active set of edges in the eventual residual network to be established. $Q_{UE}$ represents a threshold for quality between a relay node and a UE.

Figure 6:
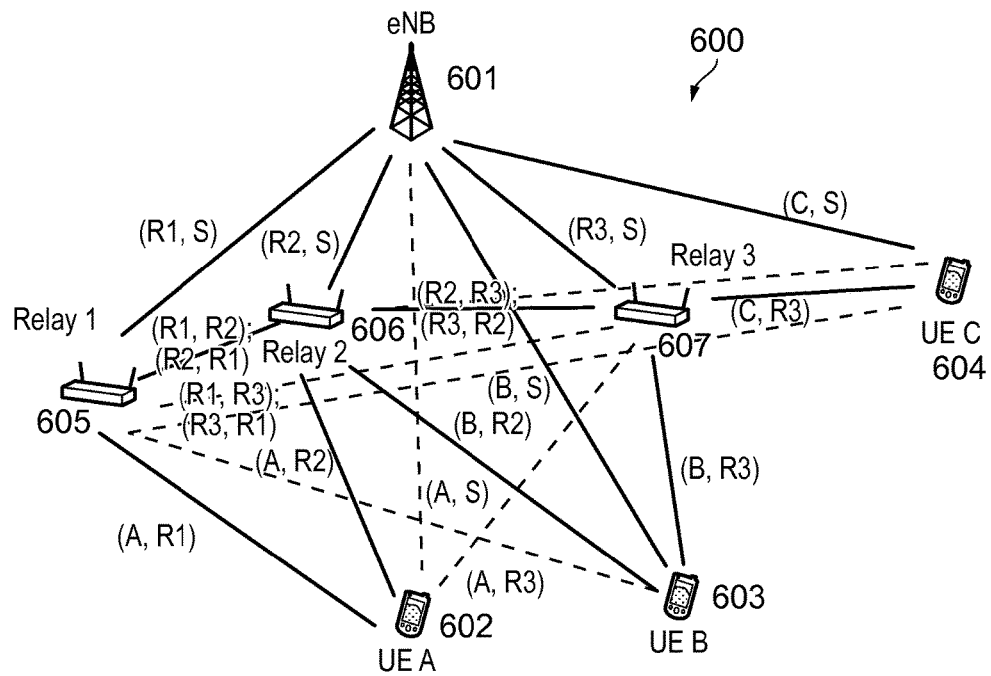
FIG. 6 illustrates an example of an active set of edges established based on measurement reports.

The active set is superimposed on the measurement set in FIG. 6, which shows another mobile communications system 600 in which three UEs 602 to 604 and three relay nodes 605 to 607 are camping under or communicating via an eNodeB 601. The edges which are measured to be of sufficient quality are marked out with bold lines, and those adjudged to be of poor quality and thus not added to the active set of edges are marked out with dashed lines. For the purposes of illustrating the other possible decision criteria for the network controller, the direct link from the UE A 602 to the eNodeB 601 is deemed to be poor enough to necessitate high transmission power and is left out of the active set for the eventual residual network. It is still possible for the direct link between the UE A 602 and eNodeB 601 to be used for control plane messages, but it is just not considered to provide a direct edge for network coded packets from the UE A 602 to the eNodeB 601.

The active set is not yet in itself sufficient for deploying network coding in the cell. In particular, in inter-session network coding, each receiver is expected to decode incoming messages and re-encode the combination of those messages into the outgoing edge. Bad design of the outgoing messages from nodes may create situations where a node cannot decode information in its incoming edge since it lacks relevant data to combine with. Thus, one of the steps in the establishment of the communications over the active set is to inform the nodes what they transmit and over which outgoing edges.

As elaborated upon in the description of the co-pending European patent application EP15151967.5, in network coding, the packets from a single source to a single sink are ideally sent over independent paths across the network, and therefore the paths do not share edges. This ensures maximal throughput gain in the network. After a suitable number of independent paths are established between respective sources and sinks, the redundant nodes and edges no longer need to be considered.

The edges may carry either a combination of packets from different flows (inter-session) across the network, or focus on a combination of packets from the same flow only (intra-session) [3]. Table II below describes the difference between intra-session network coding and inter-session network coding, as well as analogue network coding [4].

TABLE II

Comparison between different approaches to network coding

| Intra-session network coding | Inter-session network coding | Analogue network coding |
| --- | --- | --- |
| Codes packets from the same session | Codes packets from different sessions | Code signals by transmitting them concurrently |
| Decoding can be done at destination(s) | Routers typically decode and re-encode the packets | Routers need not decode, they amplify and forward mixed signals |
| Typically used for multicast applications | Typically used for unicast applications | Used for both unicast and multicast applications |
| Suitable for lossy links and unpredictable topologies | Suitable for low-loss static topologies | Suitable for high SNR channels |
| Improves reliability | Improves throughput | Improves throughput |

Figure 7:
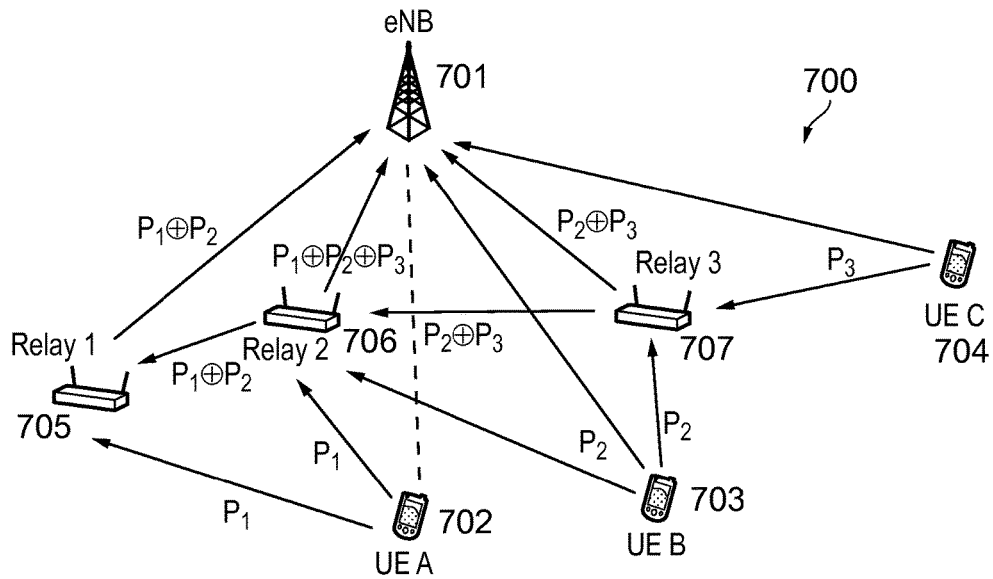
FIG. 7 illustrates an example of inter-session network coding in a wireless network.

FIG. 7 shows yet another mobile communications system 700 in which three UEs 702 to 704 and three relay nodes 705 to 707 are camping under an eNodeB 701, where the network controller has assigned rules on what sessions from incoming edges the relay nodes are sending on their outgoing edges. It can be seen that due to direct receipt of $p_2$, the eNodeB 701 can also decode $p_1 \oplus p_2$, and it advised Relay 1 705 to send this combination in uplink. Additionally, direct receipt of $p_3$ allows the eNodeB 701 to decode $p_2 \oplus p_3$ and $p_1 \oplus p_2 \oplus p_3$. In order to set up the Relay 1 705 outgoing edge combination, Relay 1 705 is advised to combine incoming edges from UE A 702 and UE B 703, whereas for the outgoing edge from Relay 2 706 towards the eNodeB 701, incoming edges from Relay 3 707 and UE A 702 are combined.

There may be other ways of selecting the optimal routes for individual UE sessions through the nodes, even in such a simple mobile communications system as those displayed in FIGS. 5 to 7. It is clear too that these principles would not only be limited to uplink communications, with a UE as the source and an eNodeB as the sink. The edges may also be set up in the downlink direction with the eNodeB as the source and a UE as the sink.

U.S. Pat. No. 8,842,599 describes relay node selection for network coding, where a number of cost functions are considered in deciding the optimal route between a source and base station across relay nodes. This patent does not consider how the UE and relay node links have been determined in the first place. The patent also only considers network coding combining of data from UEs at a single relay node, and it does not address the aspect of how the lateral connections of relay nodes to other relay nodes are established and set up.

U.S. Pat. No. 8,737,297 addresses how a relay node manages incoming packets from different sources in its buffer. It does not consider how those links from the sources to the relay node have been established in the first place.

US20110026429 also describes how a relay node combines data from multiple source nodes and sends the combined data to a destination. The patent refers to a purposeful selection of the source nodes, but does not address the aspect of the "purposefulness" of those sources have been established in the first place. It also does not address the aspect of how the lateral connections of relay nodes to other relay nodes are established and set up.

Optimising Communications in the Network

Figure 8:
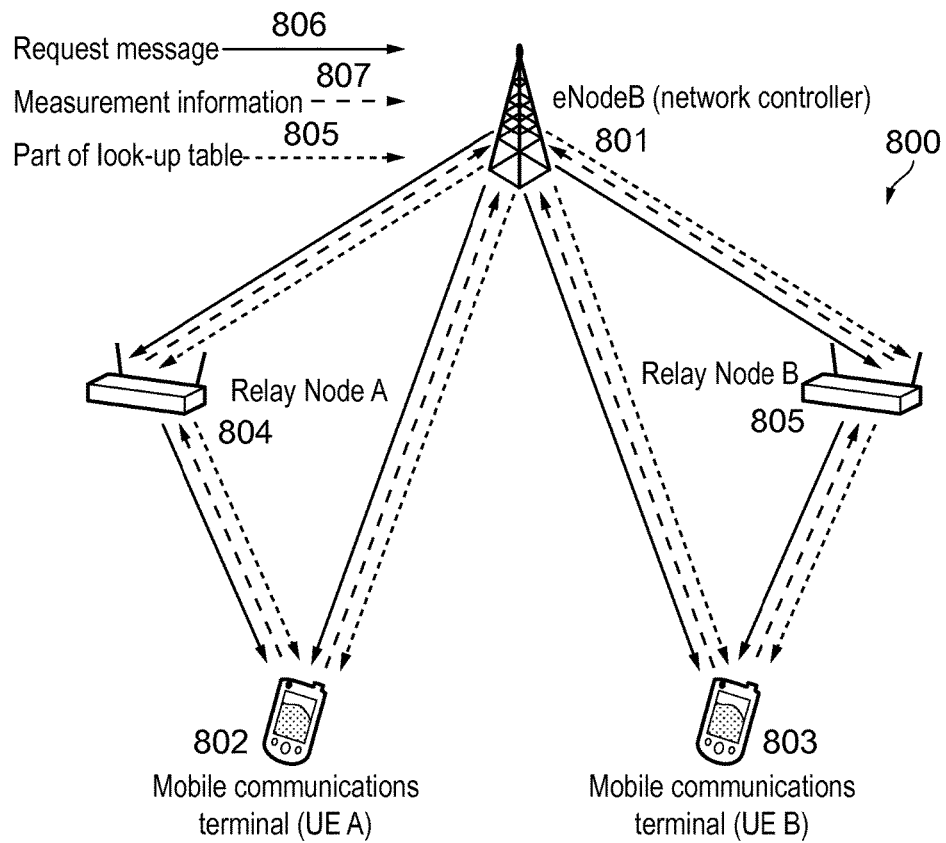
FIG. 8 illustrates an example mobile communications system in accordance with the present technique.

According to an arrangement of the present disclosure, there is provided a network controller which requests measurement information from one or more infrastructure units, and upon analysing this information, builds up a look-up table containing an active set of edges and communicates to each infrastructure unit the part of the look-up table which contains the incoming and outgoing edges for that infrastructure unit. FIG. 8 illustrates a mobile communications system 800 in accordance with an arrangement of the present disclosure. The network comprises an eNodeB 801, which serves as the network controller, two mobile communication terminals, or UEs 802 and 803, and two relay nodes 804 and 805, all of which serve the eNodeB 801. The solid arrows 806 indicate request messages, which may be sent by the eNodeB 801 to all infrastructure units in the network (the relay nodes and the UEs) which request the measurement information. This measurement information, represented by the dashed arrows 807, is then transmitted by the infrastructure units and received by the eNodeB 801, which analyses it to determine which links between various infrastructure units in the network are of a good quality and which are of a poor quality. Using this information, the eNodeB 801 builds up a look-up table containing all active edges in the network (the links which are of a sufficiently high quality) and in one example communicates only the parts of the look-up table, indicated by the dotted arrows 808, relevant to each infrastructure unit to that infrastructure unit. So, for example, UE A 802 would not receive any information about potential links between UE B 803 and relay node B 805. The mobile communications system 800 is only an example embodiment in accordance with the present disclosure, and is not limited to the number of infrastructure units depicted. A mobile communications system in accordance with the present disclosure may comprise one or more base stations which may serve as network controllers, as well as one or more relay nodes and one or more mobile communications terminals (UEs).

Figure 9:
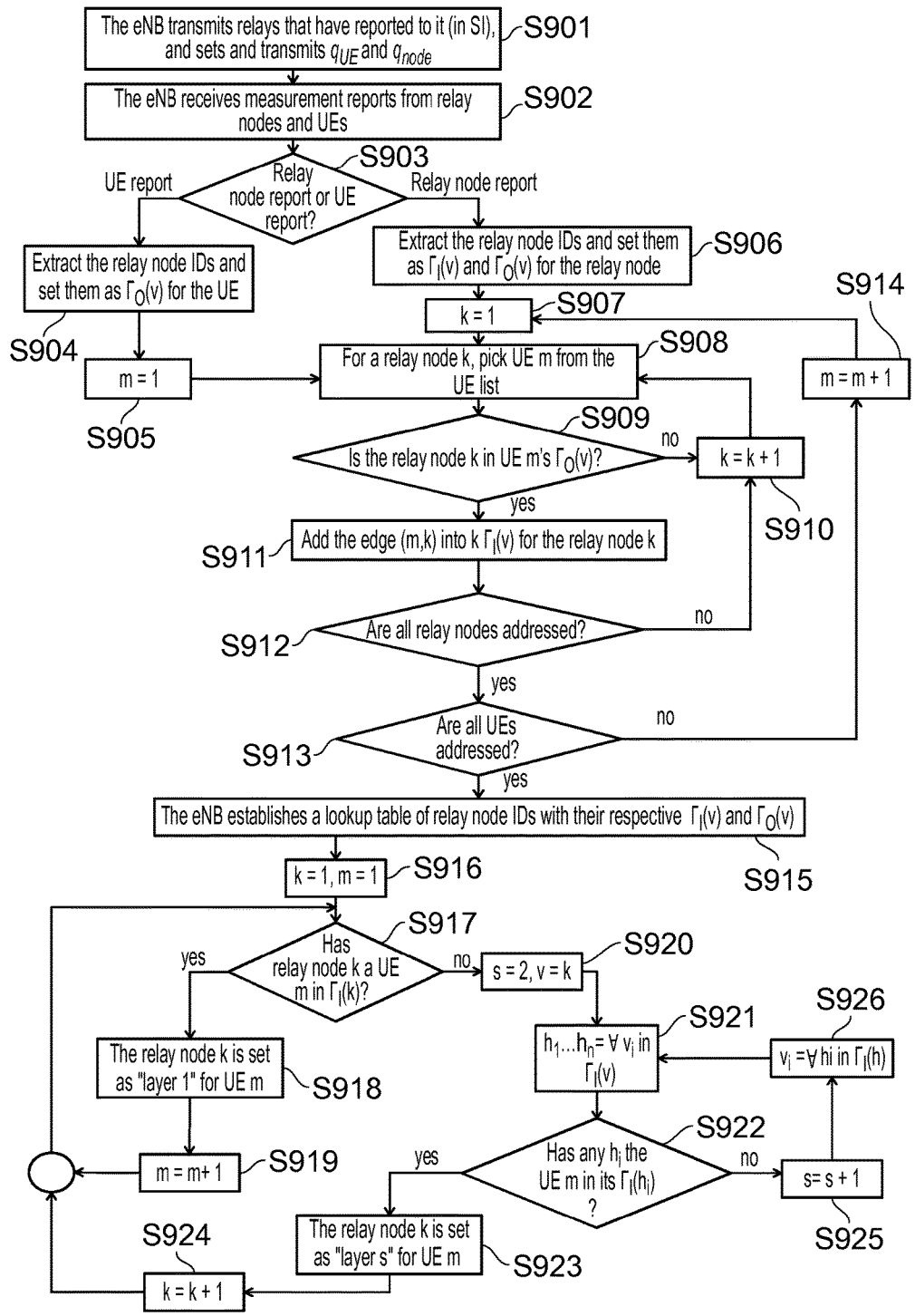
FIG. 9 is a flow diagram illustrating an example of a decision process for establishing the possible edges of the network in accordance with the present technique.

FIG. 9 shows a flow diagram illustrating the decision process 900 for how the network controller establishes the potential relay-to-relay edges from the measurement information from the UEs and relay nodes in accordance with the present disclosure. After this process has concluded, the network controller has complete information on which incoming and outgoing edges at each relay node are of sufficient quality to consider for receiving and forwarding data in the wireless relay network.

The process begins with step S901, where the eNodeB sets the values for $q_{UE}$ and $q_{node}$ and transmits a request message along with these values to all relay nodes it has identified in being in its serving cell. In step S902, the eNodeB receives, in response to the request message, measurement information from each of the relay nodes and UEs in the serving cell. The eNodeB then determines, for each measurement report, whether it was transmitted by a relay node or a UE (S903). If the report was received from a UE, the eNodeB in step S904 extracts the source IDs for all relay nodes in the network and sets them as the set of outgoing edges $\Gamma_O(v)$ for that UE, and a variable m is then set to equal 1 (S905). If, alternately, the report was received from a relay node, the eNodeB in step S906 again extracts the source IDs for all relay nodes in the network and sets them as the set of incoming edges $\Gamma_I(v)$ and outgoing edges $\Gamma_O(v)$ for that relay node, and a variable k is set to equal 1 (S907). After one of these two routes is followed, for the $k^{th}$ relay node in the serving cell, the $m^{th}$ UE in the serving cell is selected (S908). In step S909, the eNodeB determines whether the $k^{th}$ relay node is in the $m^{th}$ UE's set of outgoing edges $\Gamma_O(v)$. If not, k is incremented by 1 (S910) and the eNodeB selects the next relay node. If, however, the $k^{th}$ relay node is in the $m^{th}$ UE's set of outgoing edges $\Gamma_O(v)$), then in step S911 the edge (m, k) is added into as the set of incoming edges $\Gamma_I(v)$ for the $k^{th}$ relay node. The eNodeB assesses whether all relay nodes in the serving cell have been addressed for the $m^{th}$ UE (step S912), and if not, again goes to step S910, incrementing k by 1. If all relay nodes are addressed however, then the eNodeB goes on to determine whether all UEs have also been addressed (step S913). If not, in step S914 m is incremented by 1, but if so, then the decision process advances to step S915.

In step S915, the eNodeB uses the complete set of incoming edges $\Gamma_I(v)$ and outgoing edges $\Gamma_O(v)$ for each relay node in its serving cell to build up a look-up table matching each relay node source ID with its respective $\Gamma_I(v)$ and $\Gamma_O(v)$. In step S916, k and m are both once more set to equal 1. In step S917, the eNodeB assesses whether the $k^{th}$ relay node has the $m^{th}$ UE in its set of incoming edges $\Gamma_I(k)$, and if so, sets it as "layer one" for the UE (step S918), before incrementing m by 1 (step S919), and the process returns to step S917. If the $k^{th}$ relay node does not have the $m^{th}$ UE in its set of incoming edges $\Gamma_I(k)$, a variable s is set to equal 2 and a variable v is set to equal k (step S920). In step S921, for each of the n edges listed in the set of incoming edges $\Gamma_I(v)$ for v=k, $h_i$, for (1≤i≤n), is set to equal $v_i$. Therefore, h is then the list of nodes from which the $k^{th}$ relay node has an incoming edge. In step S922 it is determined whether any $h_i$ has the $m^{th}$ UE in its set of incoming edges $\Gamma_I(h_i)$, and if so, the $k^{th}$ relay node is set as "layer s" for the UE (step S923). This means that there are s links in the optimal path between the relay node and the UE, and s−1 relay nodes in the optimal path between them. In step S924, k is incremented by 1, and the design process returns to step S917. If no $h_i$ has the $m^{th}$ UE in its set of incoming edges $\Gamma_I(h_i)$, then s is incremented by 1 (step S925) and for each of the n edges listed in the set of incoming edges $\Gamma_I(h)$ for h=v, $v_i$, for (1≤i≤n), is set to equal $h_i$. The design process then returns to step S921.

Once the network controller has information on the quality of all of the potential edges in the wireless relay network, it will set up the active set of edges as previously described. This process is based on algorithms that find the best routes for packets between a source and a sink, given the edge conditions and any cost functions assigned to them, known to those skilled in the art. After deciding on the edges activated and what sessions are carried over them, the eNodeB informs the respective relay nodes and UEs of the setup. This takes place through downlink signalling (e.g. Radio Resource Control (RRC)) to each constituent source and node.

When we look at the example of three sources (the UEs), three relay nodes and one sink (the eNodeB) of FIGS. 6 to 8, the eNodeB, as the network controller, would initially establish all of the possible routes in which one session from a given node could be forwarded to the sink. The measurements and the reports on respective incoming and outgoing edges would result first into a linkage table, such as the one below in Table III.

TABLE III

Source-relay linkage in FIG. 8

| Source | Relay node | Distance from source |
|---|---|---|
| UE A | R1 | Layer 1 (directly on outgoing edge) |
| | R2 | Layer 1 (directly on outgoing edge) |
| | R3 | Layer 2 (one hop) |
| UE B | R1 | Layer 2 (one hop) |
| | R2 | Layer 1 (directly on outgoing edge) |
| | R3 | Layer 1 (directly on outgoing edge) |
| UE C | R1 | Layer 3 (two hops) |
| | R2 | Layer 2 (one hop) |
| | R3 | Layer 1 (directly on outgoing edge) |

Once the processing has been done and the relevant edges decided, the network controller creates a look-up table that links all the incoming edges with relevant source sessions into outgoing edges with relevant combined sessions for each relaying node, as shown below in Table IV.

Naturally, the relay nodes are not interested in what the other nodes receive in their incoming edges so the full look-up table is not provided as such to all of the nodes. Each node may receive an assignment message containing the look-up table for its own incoming and outgoing edges. Due to the fact that the inter-relay connections are expected to be set on a semi-static basis, RRC signalling is an optimal way of providing the look-up table to relay nodes when the edge set-up is centrally controlled via a serving eNodeB.

TABLE IV

Example of incoming and outgoing edges look-up table

| Node | $\Gamma_I$ (incoming edges) | | $\Gamma_O$ (outgoing edges) | |
|---|---|---|---|---|
| R1 | (A, R1) | $p_1$ | (R1, S) | $p_1 \oplus p_2$ |
| | (R2, R1) | $p_1 \oplus p_2$ | (R1, R2) | null |
| R2 | (A, R2) | $p_1$ | (R2, S) | $p_1 \oplus p_2 \oplus p_3$ |
| | (B, R2) | $p_2$ | (R2, R1) | $p_1 \oplus p_2$ |
| | (R1, R2) | null | (R2, R3) | null |
| | (R3, R2) | $p_2 \oplus p_3$ | | |

TABLE IV-continued

Example of incoming and outgoing edges look-up table

| Node | $\Gamma_I$ (incoming edges) | | $\Gamma_O$ (outgoing edges) | |
| --- | --- | --- | --- | --- |
| R3 | (B, R3) | $p_2$ | (R3, S) | $p_2 \oplus p_3$ |
|  | (C, R3) | $p_3$ | (R3, R2) | $p_2 \oplus p_3$ |
|  | (R2, R3) | null | | |

The look-up table of Table IV may explicitly define the source UEs that have packets arriving on active incoming edges. Alternatively, it may only define the active incoming and outgoing edges and leave the identification of source UEs to be deciphered from any header that the transmitting node adds to its transmission on its outgoing edge. The look-up table may also indicate the combining rule on how the packets from incoming edges are processed and sent forward. Alternatively, this may be left for the relay node to decide, in which case it would have to provide the combining information in the header that it will add to the outgoing transmission on each outgoing edge.

Table V below shows two ways of providing information on the content of packets that enter and leave relay nodes, and ways of combining them. As indicated above, in a centralised approach, RRC signaling can provide all of the details in the look-up table. This is sufficiently often because the subgraphs designed for each session are only updated either after a specified measurement interval or an (infrequent) event.

When the relay nodes operate more independently without centralised control, they may add all the source ID and combination information into L2 header information that is transmitted alongside payload.

TABLE V

Examples of source ID extraction and packet combining rules

| | Incoming edge IDs | Incoming edge combining rule | Outgoing edge IDs | Outgoing edge combining rule |
| --- | --- | --- | --- | --- |
| RRC signaling | Explicitly defined in the look-up table | Explicitly defined in the look-up table | Explicitly defined in the look-up table | Explicitly defined in the look-up table |
| L2 signaling | Extracted from incoming packet header field | Extracted from incoming packet header field | Added into outgoing packet header field | Added into outgoing packet header field |

Depending on the number of nodes in the vicinity and the decisions made in the session path algorithm, the number of edges may be large. Thus, the signalling field needs to have sufficient capacity to cover most likely scenarios. The vertices that transmit over the incoming edges have identities that were already used in the discovery and measurement process. The assignment message from the eNodeB may refer to these vertices implicitly in the same order that they were listed in the measurement reports sent by the relay nodes. Alternatively, the vertices may be signalled explicitly, although this would use more signalling resources.

Figure 10:
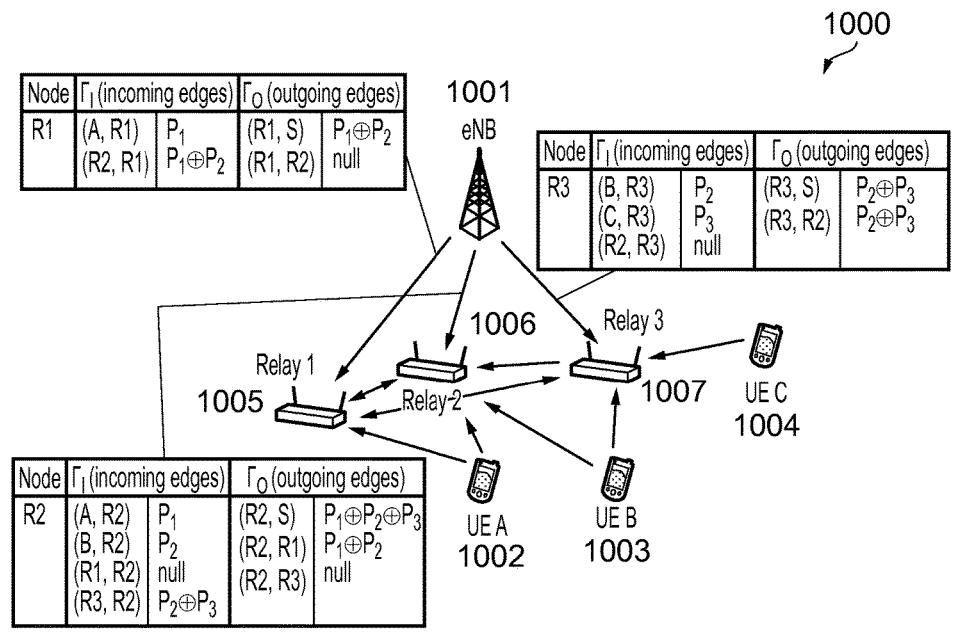
FIG. 10 illustrates an example of look-up tables being signalled to respective relay nodes in accordance with the present technique.

According to an arrangement of the present disclosure, there is provided a network controller which requests measurement information from one or more infrastructure units, and upon analysing this information, builds up a look-up table containing an active set of edges and communicates to each infrastructure unit the part of the look-up table which contains the incoming and outgoing edges for that infrastructure unit. FIG. 10 illustrates a mobile communications system 1000 in accordance with an arrangement of the present disclosure. The network comprises an eNodeB 1001, which serves as the network controller, three mobile communication terminals, or UEs 1002 to 1004, and three relay nodes 1005 to 1007, all of which serve the eNodeB 1001. It is shown, with the example followed by the look-up table of Table IV, how the information it contains is signalled to the respective relay nodes by the network controller 1001.

By default, all of the relay nodes that are connected to the same serving cell constitute a group. This high level group has no meaning in itself, but it forms, together with similar groups in neighbouring cells, the basis for further granularisation of the relay nodes into subgroups. Based on the measurement reports from the relay nodes, the network controller may determine that some relay nodes form a subgroup where inter-relay connections are of a good quality whilst some other relay nodes have poor links to any relay in that subgroup. Furthermore, the path loss measurements between the relay nodes and the eNodeB indicate whether they are at the cell edge or near the eNodeB site. Such information can be used to, for example, establish relay subgroups that may coordinate intra-relay transmission resources independently from other groups that are deemed to be far enough away. For this purpose, during the inter-relay measurement process, the relay nodes would have to report the absolute channel quality, and not simply whether the link is sufficiently good for constituting an edge. According to the present technique therefore each of the infrastructure units of one of the plurality of subgroups of infrastructure units controlled by the base station is configured to transmit signals only to the infrastructure units of the same subgroup in accordance with the created look-up table. The subgroup may be extended into a region controlled by a second base station, the base station being a first base station. The infrastructure units belonging to the one of the plurality of subgroups may be configured to synchronise to timing of infrastructure units controlled by the second base station.

A cell edge subgroup may limit direct uplink signals to the UEs connected to the incoming edges, and thus save UE transmission power. A cell edge subgroup may additionally extend the subgroup across a cell edge to another cell, which is served by a different eNodeB. In this case, relay nodes belonging to the subgroup would synchronise to the timing of the other relay nodes of the subgroup instead of their serving eNodeB, as far as device-to-device (D2D) resources are concerned.

Figure 11:
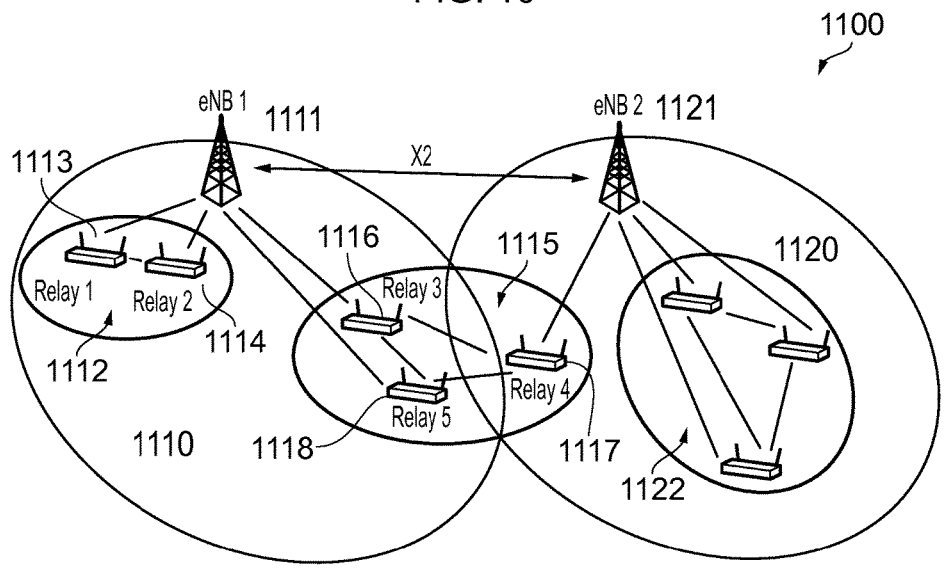
FIG. 11 illustrates relay node subgroups formed based on inter-relay measurements in accordance with an aspect of the present technique.

FIG. 11 illustrates a mobile communication system 1100 in which it is shown how relay node subgroups may be formed based on inter-relay measurements in accordance with an aspect of the present disclosure. FIG. 11 constitutes two serving cells 1110 and 1120, each with an eNodeB 1111 and 1121 respectively as its network controller. The first serving cell 1110 has two subgroups 1112 and 1115, with the first subgroup 1112 comprising of two relay nodes 1113 and 1114 and the second subgroup 1115 comprising three relay nodes 1116 to 1118. The second serving cell 1120 comprises one subgroup 1122. The two eNodeBs can communicate with one another over an X2 interface.

The second subgroup 1115 of the first serving cell 1110 is a cell edge subgroup, and as described above, the subgroup 1115 has been extended across the cell edge to the second serving cell 1120, which has the second eNodeB 1121 as its network controller. In this instance, a relay node (Relay 4 1117), which forms part of this subgroup 1115, would then synchronise to the timing of the other relay nodes 1116 and 1118 in the subgroup 1115 and hence the first eNodeB 1111 of the first serving cell 1110, rather than the second eNodeB 1121 of the second serving cell 1120 to which it belongs.

A subgroup of relay nodes may in principle extend across multiple cells, but in that case a single synchronisation source for the whole subgroup is likely to not be sensible.

From the point of view of a UE, a master synchronisation source would be employed for its D2D communications. This source may be the serving eNodeB, the master relay of a subgroup, or an independent, non-grouped relay node. The UE does not have to be aware whether it is connected into a subgroup or not.

For a relay node, the network controller manages the establishment of a subgroup through the incoming edge and outgoing edge look-up table assignments. Thus, the relay node also need not be aware whether it is a member of a subgroup or not. In cell border scenarios, the relay node may be commanded to extract its master D2D synchronisation from a relay node across the cell border and not the serving eNodeB for example, so it by definition is a member of a subgroup. However, the extent of this subgroup does not have to be known to the relay node, nor indeed does the subgroup need to consist only of these two relay nodes.

The relay nodes do not need to know whether there are other subgroups in the area. The network controller is responsible for determining from the inter-relay measurement information whether such clusters may be formed, and indicate the incoming and outgoing edges to all the relay nodes connected to the eNodeB. In a centrally controlled scenario as described here, the relay nodes and UEs enter and leave a subgroup based on look-up table updates that are provided by the network controller, as illustrated below in Table VI.

TABLE VI

Cluster management and its impact on constituent entities

| Entity | Subgroup set-up | Subgroup synchronisation | Leaving subgroup |
| --- | --- | --- | --- |
| eNodeB | Based on measurement data, in particular intra-relay link quality | — | Based on measurement data, in particular intra-relay link quality changes |
| Relay node | Incoming and outgoing edges | eNodeB or master synchronisation source | Updated incoming and outgoing edges |
| UE | Transparent to the UE | eNodeB or master synchronisation source | Transparent to the UE |

Due to the nature of wireless communication networks, it is clear that any edges established at one time will not remain persistently. A UE may move away from the cell coverage area through handover process, a relay node may be switched off or another relay node may be introduced into the cell coverage area.

Figure 12:
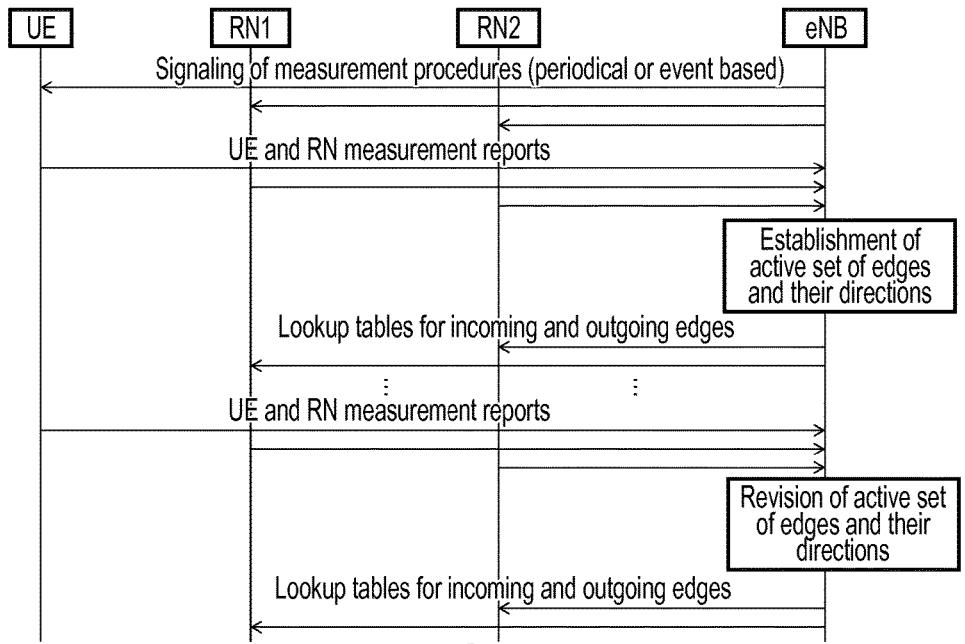
FIG. 12 illustrates an example of a periodical measurement and look-up table adjustment process in accordance with the present technique.

The eNodeB may request measurement updates during predefined regular intervals. This ensures that the link quality estimates for inter-node edges are refreshed without specific prompting by the network. During this process some links may turn out to be of considerably different quality than the previous measurements indicated and the eNodeB may take corrective steps accordingly. FIG. 12 illustrates the case where measurement reports are configured to be provided periodically, and look-up tables are updated and transmitted appropriately at those predefined regular intervals. The interval for periodic reporting may be e.g. a parameter indicated via RRC signalling. In particular, when the relay nodes are not moving, frequent measurement reports would not bring any benefit over infrequent ones.

Figure 13:
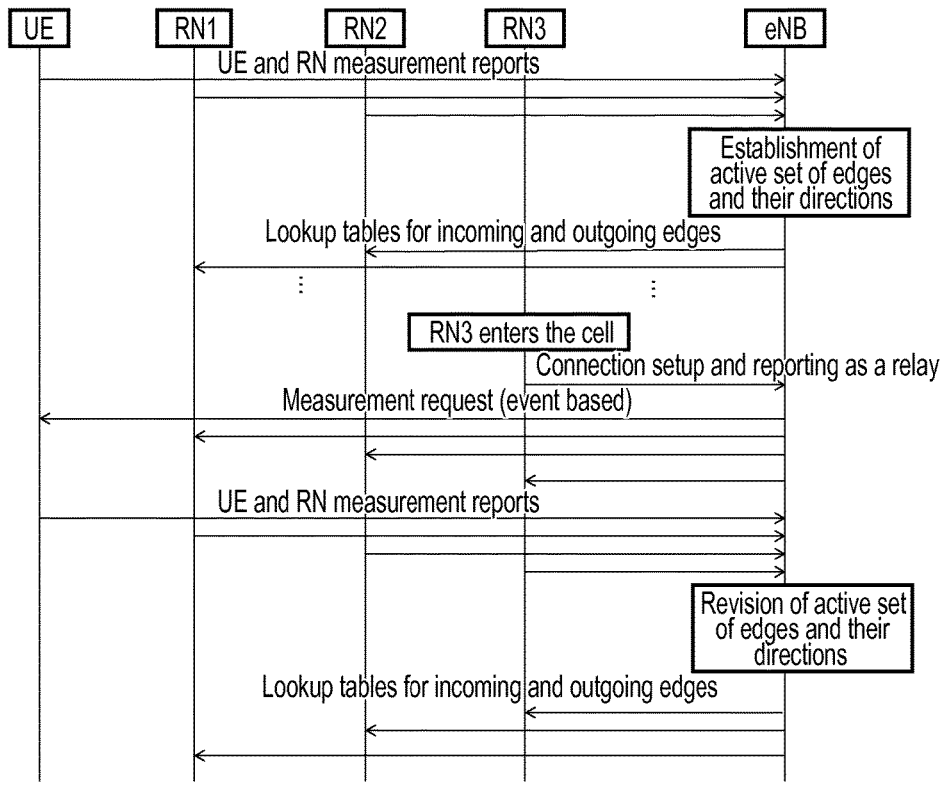
FIG. 13 illustrates an example of an event based measurement and look-up table adjustment process in accordance with the present technique.

Alternatively, the eNodeB may request measurement updates on an event basis, as is the case with many of the existing measurements in the LTE system (e.g UE neighbouring cell measurements). FIG. 13 depicts an example where a new relay node registers in the cell, and indicates that it is able to forward UE transmissions. This causes an event that requires a re-establishment of the incoming and outgoing edge information (due to the presence of a new node) for the relay nodes reporting to this eNodeB. In an analogous fashion, an active relay leaving the cell would cause an event that requires a re-establishment of the inter-relay connections (due to the absence of previously available node).

Furthermore, in the case where the network controller has decided to set up subgroups of relay nodes, the distance between any constituent relay nodes in either group may be large enough to ensure that the likelihood of interference is small. In such a situation, the eNodeB may have provided the subgroups freedom of D2D resource assignments in such a way that two non-interfering subgroups do not have to coordinate their use of D2D resources. Some of the relay nodes in these subgroups may move into the proximity of another subgroup. In this case, interference is reported by a device in one of the subgroups, because of the use of overlapping sidelink resource. Further, the eNodeB determines, from path loss measurements reported by the relay node, that the relay node has moved in relation to the eNodeB. This is an example of another case of an event based measurement and look-up table adjustment process.

It is not always the case that all of the relay nodes constituting the edges of a session between a source and sink are connected to one and the same eNodeB. In dense networks, there occur situations where a UE may have a relay node very close to it, but that relay node is connected to a different eNodeB than the UE's serving cell. Alternatively, a relay node may find another relay node that it is close proximity to, even though it is not listed as one of the discoverable relay nodes in downlink system information from the serving eNodeB.

Figure 14:
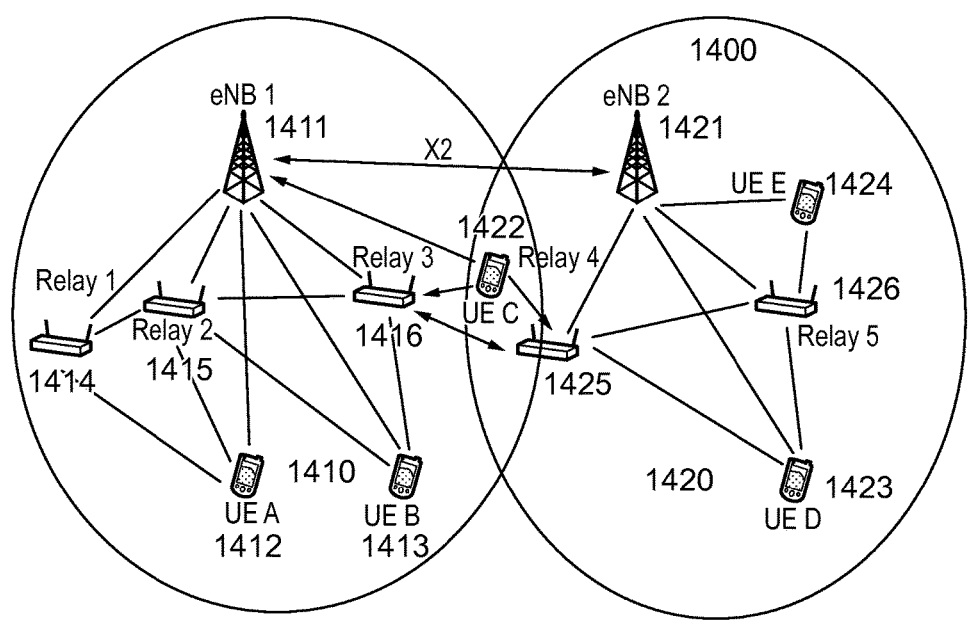
FIG. 14 illustrates a mobile communications terminal in a multi-cell relay assisted connection in accordance with an aspect of the present technique.

FIG. 14 illustrates a mobile communication system 1400 in accordance with an aspect of the present disclosure in which it is shown how both a UE and a relay node can discover and connect to a relay node under different cell. FIG. 14 constitutes two serving cells 1410 and 1420, each with an eNodeB 1411 and 1421 respectively as its network controller. The first serving cell 1410 has two UEs 1412 and 1413, and three relay nodes 1114 to 1116. The second serving cell 1420 has three UEs 1422 to 1424, and two relay nodes 1425 and 1426. The two eNodeBs can communicate with one another over an X2 interface.

The discovery of a relay node in a different serving by the UE or relay node, and the connection to it may take place independently, through observing, for example, D2D subsystem messages from relay nodes. Alternatively, the discovery may take place in a centralised fashion, where eNodeBs share information in their cells with neighbouring eNodeBs via the X2 interface.

In principle, the final decoding of the source session may take place beyond the respective eNodeBs, which in effect makes the eNodeBs only further relay nodes in the complete chain from sink to source, as far as any network coding process is concerned.

Some level of coordination would likely be needed, since relay nodes at a cell edge may interfere with one another's synchronisation signal transmissions if they happen to be scheduled at overlapping time durations by their respective serving eNodeBs. The discovery and measurement process has been previously described in co-pending European patent application EP15151967.5, and the measurement set therein may include neighbouring cell relay nodes depending on to what extent the eNodeBs coordinate. When the incoming and outgoing edge lookup tables are prepared, the eNodeBs may coordinate and add edges that cross the cell borders between relay nodes. This in no way impacts the signaling of the look-up tables to the relay nodes since such edges were already reported as being present during the discovery and measurement process.

The challenging aspect lies in the fact that relay nodes in different cells are synchronised to their own respective serving eNodeBs. Any D2D synchronisation signals that would be based on serving cell timing means that relay nodes 3 and 4 (1416 and 1425 respectively) in FIG. 14 have different basis on the synchronisation signals they would transmit, and should not do so simultaneously. In order for relay nodes camping under different cells to receive a sidelink signal from a UE near them, it is necessary to have one relay node provide the master synchronisation signal and the other relay node to align its reception to that.

In the present disclosure, the term infrastructure unit aims to refer to any network node in the radio access network which can be found on the part from a source terminal (excluded) to a base station (included). It is noteworthy that although conventional terminals operating in a legacy network are unlikely to be considered as an infrastructure unit, in some examples, such as in some D2D cases, a terminal may sometimes be considered as an infrastructure unit, for example if it relays data or transmissions from other terminals to a base station (directly or indirectly). This term can thus include a base station for a macrocell, a base station for a small cell, a femtocell, a picocell, a relay node (operating in uplink and/or downlink), a terminal providing connectivity to one or more further terminals, etc.

As used herein, transmitting information or a message to an element may involve sending one or more messages to the element and may involve sending part of the information separately from the rest of the information. The number of "messages" involved may also vary depending on the layer or granularity considered.

In accordance with the present disclosure, when an uplink only relay node relays uplink signals, it may transmit relayed signals to the base station via one or more nodes (where the relayed signals are based on the received first uplink signals). For example, the signals may be transmitted to the base station via one or more relay nodes where some or all of them may be operating in one of an uplink-only mode or an uplink-and-downlink mode.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered paragraphs provide further example aspects and features of the present technique:

Paragraph 1. A mobile communications system (800) comprising a base station (801) as a network controller, the base station being configured:
to transmit a request message (806) for measurement information (807) to one or more infrastructure units, comprising one or more relay nodes (804, 805) and one or more mobile communication terminals (802, 803);
to receive, in response to the request message, the measurement information from the one or more infrastructure units;
to analyse the measurement information to identify all potential communications paths between the one or more infrastructure units;
to create a look-up table from the analysis of the measurement information that links each of the incoming communications paths with relevant communications sessions of the infrastructure units into outgoing communications paths with relevant combined sessions for each of the relay nodes; and
to transmit at least a part (808) of the look-up table to each of the one or more infrastructure units, the at least a part of the look-up table being relevant to the infrastructure unit.

Paragraph 2. A mobile communications system (1100) according to paragraph 1, wherein the base station (1111) is configured:
to detect from the analysis of the measurement information a relative quality of the communications paths;
to organise the infrastructure units into a plurality of subgroups (1110, 1120) based on the relative quality of the communications paths, and
to create the look-up table defining the incoming and outgoing communications paths in accordance with the organised plurality of subgroups.

Paragraph 3. A mobile communications system (1100) according to paragraph 2, wherein each of the infrastructure units of one of the plurality of subgroups (1110, 1120) of infrastructure units controlled by the base station is configured:
to transmit signals only to the infrastructure units of the same subgroup and the base station in accordance with the created look-up table; and
to extend the subgroup into a region controlled by a second base station (1121), the base station (1111) being a first base station, wherein the infrastructure units belonging to the one of the plurality of subgroups are configured to synchronise to timing of infrastructure units controlled by the second base station.

Paragraph 4. A mobile communications system according to paragraphs 1 or 2, wherein the infrastructure units are configured:
to transmit updates of the measurement information to the base station; and
to receive in response an updated version of the look-up table from the base station, the look-up table being updated by the base station in response to a change in the received updated measurement information.

Paragraph 5. A mobile communications system according to paragraph 4, wherein the update of the measurement information is performed periodically.

Paragraph 6. A mobile communications system according to paragraph 4, wherein the update of the measurement information is performed in aperiodically.

Paragraph 7. A mobile communications system according to paragraph 4, wherein the update of the measurement information is performed in response to an event in which there is change in the infrastructure units which can communicate via the base station.

Paragraph 8. A mobile communications system (1400) according to any of paragraphs 1 to 7, wherein the base station is a first base station and the system includes a second base station (1421), the first and second base station being configured:
  to detect whether an infrastructure unit (1422) in a serving cell of the second base station has a better communications link to one or more infrastructure units in the serving cell of the first base station than one or more infrastructure units in the serving cell of the second base station; and consequently
  to add communications paths between the infrastructure unit connected to the second base station and one or more infrastructure units connected to the first base station.

Paragraph 9. A mobile communications system according to any of paragraphs 1 to 8, wherein the mobile communications system operates in accordance with a 3GPP LTE standard.

Paragraph 10. A method of operating a base station (801) as a network controller, the method comprising:
  transmitting a request message (806) for measurement information (807) to one or more infrastructure units, comprising one or more relay nodes (804, 805) and one or more mobile communication terminals (802, 803);
  receiving, in response to the request message, the measurement information from the one or more infrastructure units;
  analysing the measurement information to identify all potential communications paths between the one or more infrastructure units;
  creating a look-up table from the analysis of the measurement information that links each of the incoming communications paths with relevant communications sessions of the infrastructure units into outgoing communications paths with relevant combined sessions for each of the relay nodes; and
  transmitting at least a part (808) of the look-up table to each of the one or more infrastructure units, the at least a part of the look-up table being relevant to the infrastructure unit.

Paragraph 11. A method according to paragraph 10, comprising:
  detecting from the analysis of the measurement information a relative quality of the communications paths;
  organising the infrastructure units into a plurality of subgroups (1110, 1120) based on the relative quality of the communications paths; and
  creating the look-up table defining the incoming and outgoing communications paths in accordance with the organised plurality of subgroups.

Paragraph 12. A method according to paragraph 10 or 11, comprising:
  controlling the transmission of signals from the infrastructure units in accordance with the look-up table, which have been created with the infrastructure units organised into the plurality of sub-groups, wherein the controlling the transmission of the signals comprises
  transmitting signals only to the infrastructure units of the same subgroup and the base station via the outgoing communications paths in accordance with the created look-up table;
  extending the subgroup across into a region controlled by a second base station (1121), the base station (1111) being a first base station; and
  synchronising the infrastructure units belonging to the one of the plurality of subgroups to timing of infrastructure units controlled by the second base station.

Paragraph 13. A method according to paragraph 10, 11 or 12, comprising:
  transmitting updates of the measurement information; and
  receiving in response an updated version of the look-up table from the base station, the look-up table being updated by the base station in response to a change in the received updated measurement information.

Paragraph 14. A method according to paragraph 13, wherein the update of the measurement information is performed periodically.

Paragraph 15. A method according to paragraph 13, wherein the update of the measurement information is performed in aperiodically.

Paragraph 16. A method according to paragraph 13, wherein the update of the measurement information is performed in response to an event in which there is change in the infrastructure units which can communicate via the base station.

Paragraph 17. A method according to any of paragraphs 10 to 16, comprising:
  detecting whether an infrastructure unit (1422) in a serving cell of a second base station has a better communications link to one or more infrastructure units in the serving cell of the base station than one or more infrastructure units in the serving cell of the second base station, the base station being a first base station; and consequently
  adding communications paths between the infrastructure unit connected to the second base station and one or more infrastructure units connected to the first base station.

REFERENCES

[1] 3GPP TR36.872 V12.1.0, "Small cell enhancements for E-UTRA and E-UTRAN—Physical Layer aspects", December 2013.
[2] Holma H. and Toskala A., "LTE for UMTS OFDMA and SC-FDMA Based Radio Access", John Wiley & Sons Limited, January 2010.
[3] P. Pahlevani et al, "Novel concepts for Device-to-device communications using network coding", IEEE Communications Magazine, April 2014, pp. 32-39
[4] M. Medard, A. Sprintson, "Network Coding: Fundamentals and Applications", Academic Press, 2012

The invention claimed is:

1. A mobile communications system comprising:
  a base station as a network controller, the base station configured to:
    transmit a request message for measurement information to one or more infrastructure units, comprising one or more relay nodes and one or more mobile communication terminals;
    receive, in response to the request message, the measurement information from the one or more infrastructure units;
    analyse the measurement information to identify all potential communications paths between the one or more infrastructure units;
    create a look-up table from the analysis of the measurement information that links each of the incoming communications paths with relevant communications sessions of the infrastructure units into outgoing communications paths with relevant combined sessions for each of the relay nodes; and
transmit at least a part of the look-up table to each of the one or more infrastructure units, the at least a part of the look-up table being relevant to the infrastructure unit.

2. The mobile communications system of claim 1, wherein the base station is configured to:
detect from the analysis of the measurement information a relative quality of the communications paths;
organise the infrastructure units into a plurality of subgroups based on the relative quality of the communications paths; and
create the look-up table defining the incoming and outgoing communications paths in accordance with the organised plurality of subgroups.

3. The mobile communications system of claim 2, wherein each of the infrastructure units of one of the plurality of subgroups of infrastructure units controlled by the base station is configured to:
transmit signals only to the infrastructure units of the same subgroup and the base station in accordance with the created look-up table; and
extend the subgroup into a region controlled by a second base station, the base station being a first base station, wherein the infrastructure units belonging to the one of the plurality of subgroups are configured to synchronise to timing of infrastructure units controlled by the second base station.

4. The mobile communications system of claim 1, wherein the infrastructure units are configured to:
transmit updates of the measurement information to the base station; and
receive in response an updated version of the look-up table from the base station, the look-up table being updated by the base station in response to a change in the received updated measurement information.

5. The mobile communications system of claim 4, wherein the update of the measurement information is performed periodically.

6. The mobile communications system of claim 4, wherein the update of the measurement information is performed in aperiodically.

7. The mobile communications system of claim 4, wherein the update of the measurement information is performed in response to an event in which there is change in the infrastructure units which can communicate via the base station.

8. The mobile communications system of claim 1, wherein the base station is a first base station and the system includes a second base station, the first and second base station being configured to:
detect whether an infrastructure unit in a serving cell of the second base station has a better communications link to one or more infrastructure units in the serving cell of the first base station than one or more infrastructure units in the serving cell of the second base station; and consequently
add communications paths between the infrastructure unit connected to the second base station and one or more infrastructure units connected to the first base station.

9. The mobile communications system of claim 1, wherein the mobile communications system operates in accordance with a 3rd Generation Partnership Project (3GPP) Long-Term Evolution (LTE) standard.

10. A method of operating a base station as a network controller, the method comprising:
transmitting a request message for measurement information to one or more infrastructure units, comprising one or more relay nodes and one or more mobile communication terminals;
receiving, in response to the request message, the measurement information from the one or more infrastructure units;
analysing the measurement information to identify all potential communications paths between the one or more infrastructure units;
creating a look-up table from the analysis of the measurement information that links each of the incoming communications paths with relevant communications sessions of the infrastructure units into outgoing communications paths with relevant combined sessions for each of the relay nodes; and
transmitting at least a part of the look-up table to each of the one or more infrastructure units, the at least a part of the look-up table being relevant to the infrastructure unit.

11. The method of claim 10, comprising:
detecting from the analysis of the measurement information a relative quality of the communications paths;
organising the infrastructure units into a plurality of subgroups based on the relative quality of the communications paths; and
creating the look-up table defining the incoming and outgoing communications paths in accordance with the organised plurality of subgroups.

12. The method of claim 11, comprising:
controlling the transmission of signals from the infrastructure units in accordance with the look-up table, which have been created with the infrastructure units organised into the plurality of sub-groups, wherein the controlling the transmission of the signals comprises
transmitting signals only to the infrastructure units of the same subgroup and the base station via the outgoing communications paths in accordance with the created look-up table;
extending the subgroup across into a region controlled by a second base station, the base station being a first base station; and
synchronising the infrastructure units belonging to the one of the plurality of subgroups to timing of infrastructure units controlled by the second base station.

13. The method of claim 10, comprising:
transmitting updates of the measurement information; and
receiving in response an updated version of the look-up table from the base station, the look-up table being updated by the base station in response to a change in the received updated measurement information.

14. The method of claim 13, wherein the update of the measurement information is performed periodically.

15. The method of claim 13, wherein the update of the measurement information is performed in aperiodically.

16. The method of claim 13, wherein the update of the measurement information is performed in response to an event in which there is change in the infrastructure units which can communicate via the base station.

17. The method of claim 10, comprising:
detecting whether an infrastructure unit in a serving cell of a second base station has a better communications link to one or more infrastructure units in the serving cell of the base station than one or more infrastructure units in the serving cell of the second base station, the base station being a first base station; and consequently adding communications paths between the infrastructure unit connected to the second base station and one or more infrastructure units connected to the first base station.

18. A base station forming part of a mobile communications system, the base station comprising:
a communication interface configured to
transmit a request message for measurement information to one or more infrastructure units, comprising one or more relay nodes and one or more mobile communication terminals; and
receive, in response to the request message, the measurement information from the one or more infrastructure units; and
processing circuitry configured to
analyze the measurement information to identify all potential communications paths between the one or more infrastructure units; and
to create a look-up table from the analysis of the measurement information that links each of the incoming communications paths with relevant communications sessions of the infrastructure units into outgoing communications paths with relevant combined sessions for each of the relay nodes, wherein
the communication interface is configured to transmit at least a part of the look-up table to each of the one or more infrastructure units, the at least a part of the look-up table being relevant to the infrastructure unit.

19. The base station of claim 18, wherein the processing circuitry is configured to:
organize the infrastructure units into a plurality of subgroups based on the measurement information;
create the look-up table defining the incoming and outgoing communications paths in accordance with the organized plurality of subgroups; and
control each of the infrastructure units of one of the plurality of subgroups to
transmit signals only to the infrastructure units of the same subgroup and the base station in accordance with the created look-up table; and
extend the subgroup into a region controlled by a second base station, wherein the infrastructure units belonging to the one of the plurality of subgroups are configured to synchronize to timing of infrastructure units controlled by the second base station.

20. The base station of claim 18, wherein
a combined session is a session in which data is received from different ones of the one or more relay nodes and one or more mobile communication terminals via different incoming communications paths and combined by a relay node for transmission via an outgoing communication path from the relay node.

* * * * *